United States Patent [19]
Cheng

[11] Patent Number: 5,629,641
[45] Date of Patent: May 13, 1997

[54] DIFFERENTIAL CMOS CURRENT AMPLIFIER WITH CONTROLLED BANDWIDTH AND COMMON MODE DISTORTION

[75] Inventor: Yi Cheng, San Jose, Calif.

[73] Assignee: Advanced Micro Devices, Inc., Sunnyvale, Calif.

[21] Appl. No.: 595,870

[22] Filed: Feb. 6, 1996

[51] Int. Cl.[6] .......................... H03K 3/00; H03K 17/687; H02M 7/162
[52] U.S. Cl. .......................... 327/108; 327/427; 327/588
[58] Field of Search .......................... 327/108–112, 53, 327/66, 427, 434–437, 478, 494, 574, 587, 588, 103

[56] References Cited

U.S. PATENT DOCUMENTS

| | | | |
|---|---|---|---|
| 3,980,900 | 9/1976 | Ishigaki et al. | 327/588 |
| 4,805,214 | 2/1989 | Fensch et al. | 327/208 |
| 5,166,635 | 11/1992 | Shih | 330/253 |
| 5,336,946 | 8/1994 | Segaram et al. | 307/355 |
| 5,379,208 | 1/1995 | Shinozaki | 327/110 |
| 5,410,188 | 4/1995 | Segaram | 327/237 |
| 5,469,095 | 11/1995 | Peppiette et al. | 327/108 |
| 5,477,171 | 12/1995 | Menegoli et al. | 327/104 |

*Primary Examiner*—Toan Tran

[57] ABSTRACT

A differential current amplifier operating at a low power while maintaining high linearity includes a bridge arrangement of current mirrors connected to each input node of the amplifier, and a common mode feedback circuit. Opposite legs of the bridge are controlled commonly, but complementary to the other legs. An integrated resistor network of the current amplifier balances delay of the output current and controls amplifier bandwidth.

30 Claims, 9 Drawing Sheets

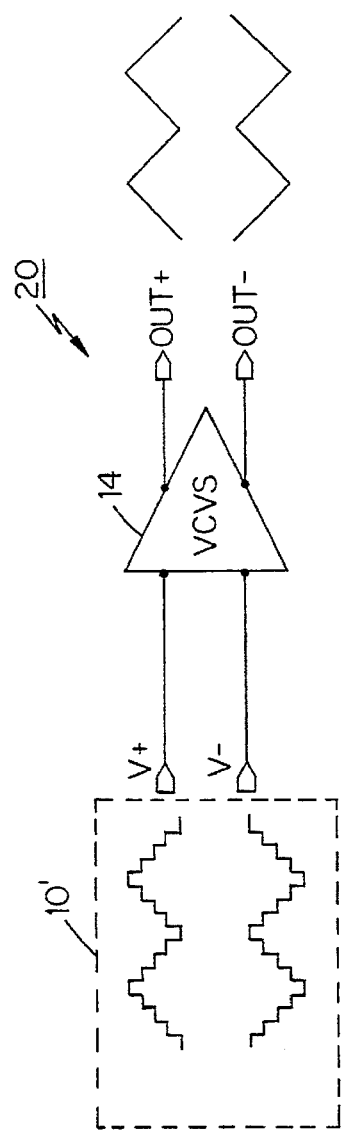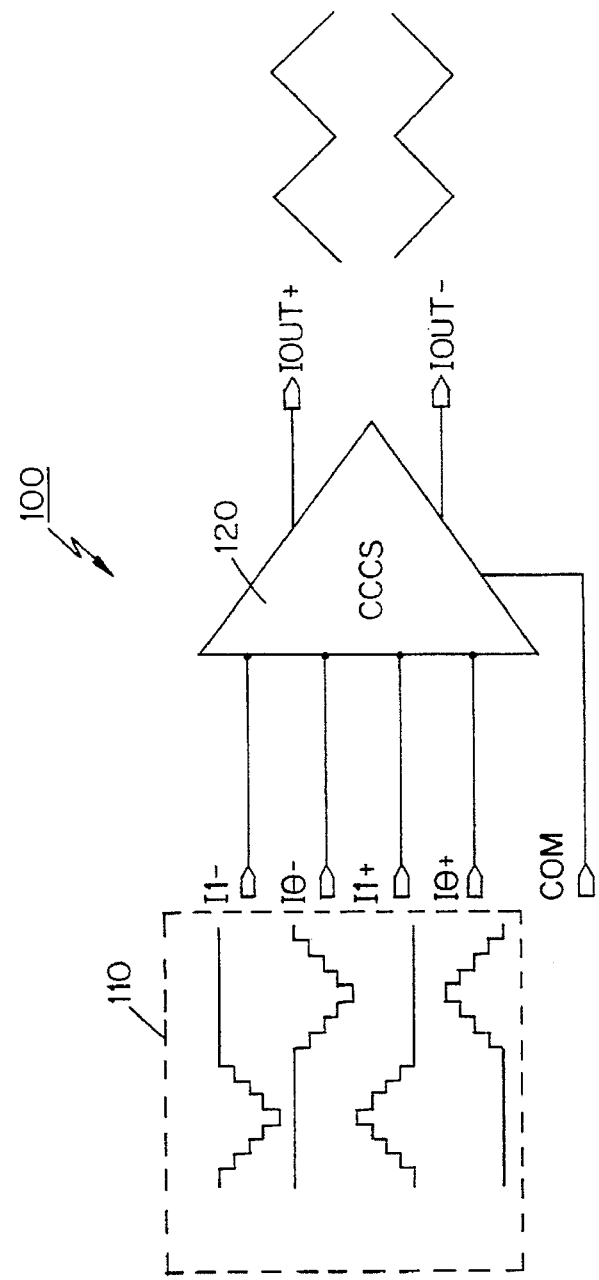

DIFFERENTIAL CMOS CURRENT AMPLIFIER WITH CONTROLLED BANDWIDTH AND COMMON MODE DISTORTION

TECHNICAL FIELD

The present invention relates to data communication systems, and more particularly, to line drivers of data communication systems.

BACKGROUND ART

In data communication systems, a plurality of digital devices may be connected together by transmission lines to communicate with each other at high speed and over a large voltage swing. To achieve such a result, the device may include a line driver, which is often necessary to drive the transmission line. For example, a 10BaseT Ethernet (IEEE Standard 802.3) line driver is required to drive a signal having a peak-to-peak voltage swing of 5 volts (V) at a 10 megabit per second rate (MHz) on an unshielded twisted pair cable of a 50 ohm load.

FIG. 1 is a schematic diagram of a conventional digital line driver 5 comprising PMOS transistors 1 and 4 and NMOS transistors 2 and 3. The input signals of a square waveform applied at the input terminals IN+ and IN− are provided from an internal element of a digital device. The input signals, however, have a low power density (low current level), and the digital line driver 5 amplifies the input signals to provide signals with a high power density (high current) at the output terminals OUT+ and OUT−. Such output signals are necessary to drive the transmission line of 50 ohms connected at the output terminals OUT+ and OUT−.

In FIG. 1, every MOS transistor 1–4 is working in a "switch" mode. When the PMOS transistor 1 is switched ON, the NMOS transistor 3 is switched ON at the same time, and the NMOS and PMOS transistors 2 and 4 are switched OFF. Similarly, when the NMOS and PMOS transistors 2 and 4 are switched ON at the same time, the PMOS and NMOS transistors 1 and 3 are switched OFF. Thus, each output signal has only two levels, i.e., a logic high (when the transistors 1 and 3 are ON) and a logic low (when the transistors 2 and 4 are ON).

Since the line driver 5 has a simple design structure, a minimum area on a silicon wafer is used for the driver. Further, the line driver 5 has a high power efficiency since the transistors are turned ON only when they deliver the high current output signals to the output terminals OUT+ and OUT−. Thus, no quiescent bias is needed.

Since the line driver 5 outputs a square waveform of only two output levels, i.e. a step function, the output signals have unacceptable harmonic contents or electromagnetic interference (EMI), and cannot be used to directly drive an unshielded twisted pair cable. An additional off-chip filter module is used to "clean up" an output signal from an output port of a digital device prior to the transmission into the unshielded twisted pair cable. Since the digital device may have many output ports, additional off-chip filter modules increase the cost, and reduce integration.

FIG. 2 is an illustration of a digital-to-analog converter (DAC) 10, which is used as a digital line driver, to reduce the high frequency harmonics. Each of the MOS transistors $6_1$–$6_{n+i}$ functions as a fixed value current source, and a plurality of paired MOS transistors $8_1$–$8_{n+i}$ functions as switches and turns ON and OFF in response to two level digital input signals at the input terminals IN0+ to INn+ and IN0− to INn−. The amount of the current flow into output terminals OUT+ and OUT−, and the shape of the output signals are controlled by a number of transistors that are switched ON to create a conductive path between the current sources and the output terminals.

Compared to the output signals of FIG. 1, the output signals of the FIG. 2 circuit reach a logic high or a logic low level gradually in multiple steps or increments. The number of steps or increments is based on the number of current sources of the DAC 10. Ideally, a DAC 10 should be able to generate output signals having any type of waveform shape in response to the digital input signals.

The DAC 10 can change the output signals in a continuous fashion such that a dominant frequency content is limited to be below a certain bandwidth. For example, if a cable is driven by a single frequency sinusoidal signal, the frequency content will not go beyond that frequency, since a pure analog sinusoidal signal has no harmonics.

The DAC 10 eliminates the fast transition from a logic low to a logic high. The waveform of the output signals can be shaped as desired such that spectral energy is limited below a certain bandwidth. Hence, a costly off-chip filter module for digital line driver 5 is no longer necessary. However, the output signals of the DAC still cannot be directly connected to the transmission line. As described above, the output signals are incremented in a plurality of steps. Each step is a high frequency signal, which needs to be cleaned up using a less costly one-pole filter, such as a capacitor, to smooth out the output signal at each output terminal.

Further, the "sum of currents" in a digital-to-analog conversion requires many large sized transistors to deliver sufficient weighted currents to the output nodes OUT+ and OUT−. Hence, the DAC 10 requires significantly larger silicon area compared to the digital driver 10. Since the transistors are larger, the DAC 10 also consumes more power than the digital line driver 5.

FIG. 3 is an illustration of a line driver 20 comprising a DAC 10' with the output nodes connected to the input terminals V+ and V− of an operational amplifier (op-amp 14). U.S. Pat. Nos. 5,166,635 and 5,336,946 disclose an operational based line driver with similar configurations. The operational amplifier 20 is a Voltage Controlled Voltage Source (VCVS), i.e., the voltage levels of the input signals control other voltage sources of the operational amplifier to control the voltage levels of the output signals, which is used to amplify a pre-shaped waveform outputted from the DAC 10'. The output power density of the DAC 10' is significantly lower compared to that of the DAC 10 of FIG. 2.

The operational amplifier 14 receives the sampled-data of a low power density and outputs a continuous signal of a required power density to a load, e.g., a transmission line. Since the current density of the weighted current source in the DAC 10' is very small, the major silicon usage is the operational amplifier 14, which delivers all the power to the load.

The operational amplifier 14 is easy to design, and delivers a well defined power density to the load with high voltage swing and high efficiency. Further, the operational amplifier 14 has a certain frequency response limited by the gain bandwidth, which may totally eliminate the requirement for the off-chip filter modules.

The design of the operational amplifier requires a high gain stage and certain feedback circuit(s) (not shown) to provide an overall stable current/voltage gain. A high gain bandwidth is also required for a stable output impedance over a certain frequency range. However, the high gain and closed loop (feedback) design introduce unstable conditions in the operation of the operational amplifier 14.

For example, resistors (not shown) are used in a negative feedback path of the operational amplifier 14. During fabrication of the resistor, the temperature or process may change. Hence, the original design conditions for the operational amplifier 14 may not be meet, and the operation amplifier 14 may operate in an unstable state, i.e., produce oscillation. Further, the parasitic resistance changes over the frequency range, and the operational amplifier 14 becomes unstable.

Moreover, an operational amplifier with a high gain bandwidth requires the transistors of the operational amplifier to have a high characteristic frequency $f_T$, which is not always available, especially in CMOS based components. For example, the transistors made from a CMOS process based on a prescribed micron (u) technology (e.g., 1.0 u, 0.8 u, 0.35 u, etc) may not have a high characteristic frequency to operate in very high frequencies (e.g, 100 MHz, 600 Mz, 1 GHz, etc).

DISCLOSURE OF THE INVENTION

According to the present invention, various advantages are achieved in part by a line driver having a plurality of current mirror circuits CM1, CM2, CM3 and CM4 to amplify input signal currents at input terminals I1−, I0−, I1+ and I0+ thereof, respectively, and a pair of common mode feed back circuits F1 and F2 to reduce common mode voltage at output terminals IOUT+ and IOUT−. The plurality of current mirror circuits CM1–CM4 are coupled to each other in a bridge configuration at the output terminals IOUT+ and IOUT−.

Each of the current mirror circuits CM1 and CM2 preferably comprises a first PMOS transistor with its gate connected to a first resistor, conductively coupling the first PMOS transistor to the gate of a second PMOS transistor. The source of the first PMOS transistor is connected to a predetermined source voltage VCC, and its drain is connected to a corresponding input terminal I1− or I0−. The source of the second PMOS transistor is connected to the predetermined voltage VCC while its drain is connected to a corresponding output terminal IOUT+ or IOUT−.

Each of the current mirror circuits CM3 and CM4 comprises a first NMOS transistor with its gate connected to a second resistor, conductively coupling the first NMOS transistor to the gate of a second NMOS transistor. The source of each of the first and second NMOS transistors is connected to the predetermined reference voltage VSS. The drain of the first NMOS transistor is connected to the corresponding input terminal I1+ or I0+ while the drain of the second NMOS transistor is connected to the output terminal IOUT+ or IOUT−, respectively.

A signal at a control terminal COM is used to enable or disable a first common mode circuit F1 comprising a plurality of PMOS transistors and a second common mode feedback circuit F2 comprising a plurality of NMOS transistors. The common mode circuits F1 and F2 are connected to a node VREF to receive a common mode output voltage level of the output terminals IOUT+ and IOUT− between third and fourth resistors.

Additional advantages, objects and other features of the invention will be set forth in part in the description which follows and in part will become apparent to those having ordinary skill in the art upon examination of the following or may be learned from practice of the invention. The objects and advantages of the invention may be realized and attained particularly pointed out in the appended claims.

BRIEF DESCRIPTION OF THE DRAWINGS

The invention will be described in detail with reference to the following drawings in which like reference numerals refer to like elements wherein:

FIG. 3 is an illustration of a conventional operational amplifier based line driver;

FIG. 4 depicts a line driver in accordance with the present invention;

BEST MODE FOR CARRYING OUT THE INVENTION

FIG. 4 illustrates a line driver 100 in accordance with the present invention. The line driver 100 includes a differential current amplifier 120 having a plurality of input terminals I0+, I0−, I1+ and I1−, a control terminal COM, and a pair of output terminals IOUT+ and IOUT−. Rather than using an operational amplifier of a Voltage Controlled Voltage Source (VCVS), the amplifier 120 is a Current Controlled Current Source (CCCS), i.e., the current levels of the input signals control other current sources to produce output signals of prescribed current levels.

The input signals are generated by a digital-to-analog converter (DAC) 110. Unlike the DAC 10' of FIG. 3, the DAC 110 converts the digital signals into four discrete sampled-data of low power density. Each sampled-data is applied to a corresponding input terminal I0−, I0+, I1+ and I1−. Such a DAC 110 is disclosed in U.S. application Ser. No. 08/599,653, assigned to the assignee of the present invention, which is incorporated herein by reference.

Figure 5:
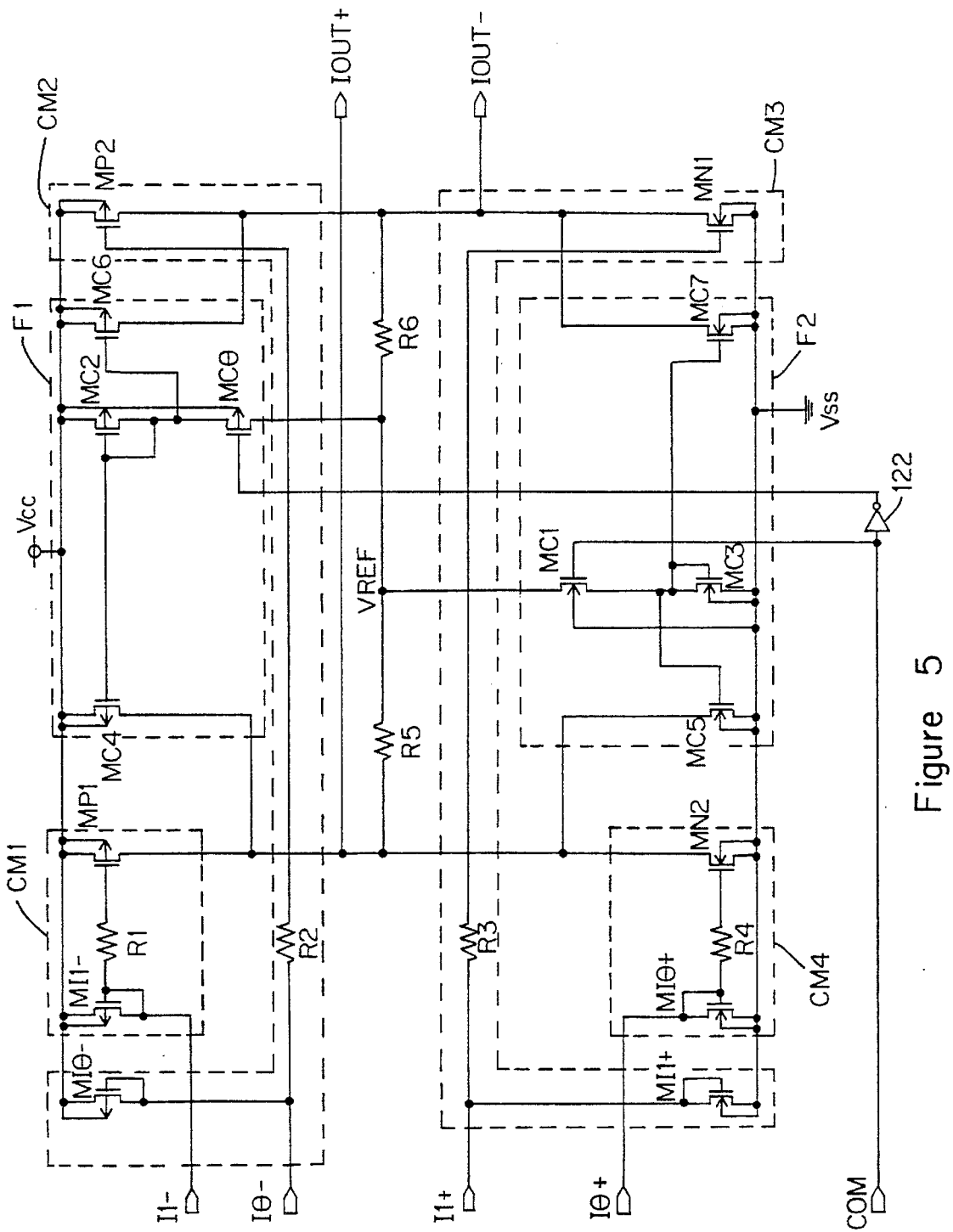
FIG. 5 is a detailed schematic diagram of the differential current amplifier illustrated in FIG. 4.

FIG. 5 is a detailed schematic diagram of the differential current amplifier 120 of FIG. 4 connected to a predetermined source voltage VCC and a predetermined reference voltage VSS of 0 V or ground. The amplifier includes a plurality of current mirror circuits CM1, CM2, CM3 and CM4 coupled to the input terminals I1−, I0−, I1+ and I0+, respectively, and a pair of common mode feedback circuits F1 and F2 connected to the voltage dividing resistors R5 and R6 to reduce the common mode voltages at the output terminals IOUT+ and IOUT−. The current mirror circuits CM1 and CM4 are connected to the output terminal IOUT+, and the current mirror circuits CM2 and CM3 are connected to the output terminal IOUT−. The resistors R5 and R6 also conductively couple together the output terminals IOUT+ and IOUT− such that the current mirror circuits CM1–CM4 are arranged in a bridge configuration.

The current mirror circuit CM1 comprises a PMOS transistor MI1− with its gate connected to a resistor R1, conductively coupling the transistor MI1− to the gate of a PMOS transistor MP1. The source of the transistor MI1− is connected to the predetermined source voltage VCC, and its drain is connected to the input terminal I1−. The source of the transistor MP1 is connected to the predetermined voltage VCC while its drain is connected to the output terminal IOUT+. The resistor R1 is used to provide a current path mirroring the input transistor MI− to the output transistor MP1 in response to the input signal at the input terminal I1−.

The current mirror CM3 comprises an NMOS transistor MI1+ with a gate connected to a resistor R3, conductively coupling the transistor MI1+ to a gate of a NMOS transistor MN1. The sources of the transistors MI1+ and MN1 are connected to the predetermined reference voltage VSS. The drain of the transistor MI1+ is connected to the input terminal I1+ while the drain of the transistor MN1 is connected to the output terminal IOUT−. The resistor R3 provides a current path mirroring the input transistor MI+ to the output transistor MN1 in response to the input signal at the input terminal I1+.

The current mirror CM2 includes a PMOS transistor MI0−, a resistor R2 and a PMOS transistor MP2 in a configuration similar to the current mirror CM1, but is responsive the input signal at the input terminal I0− to output a mirroring current at the output terminal IOUT−. The current mirror CM4 includes an NMOS transistor MI0+, a resistor R4 and an NMOS transistor MN2 in a configuration similar to the current mirror CM3, but is responsive the input signal at the input terminal I0+ to output a mirroring current at the output terminal IOUT+.

Figure 6A:
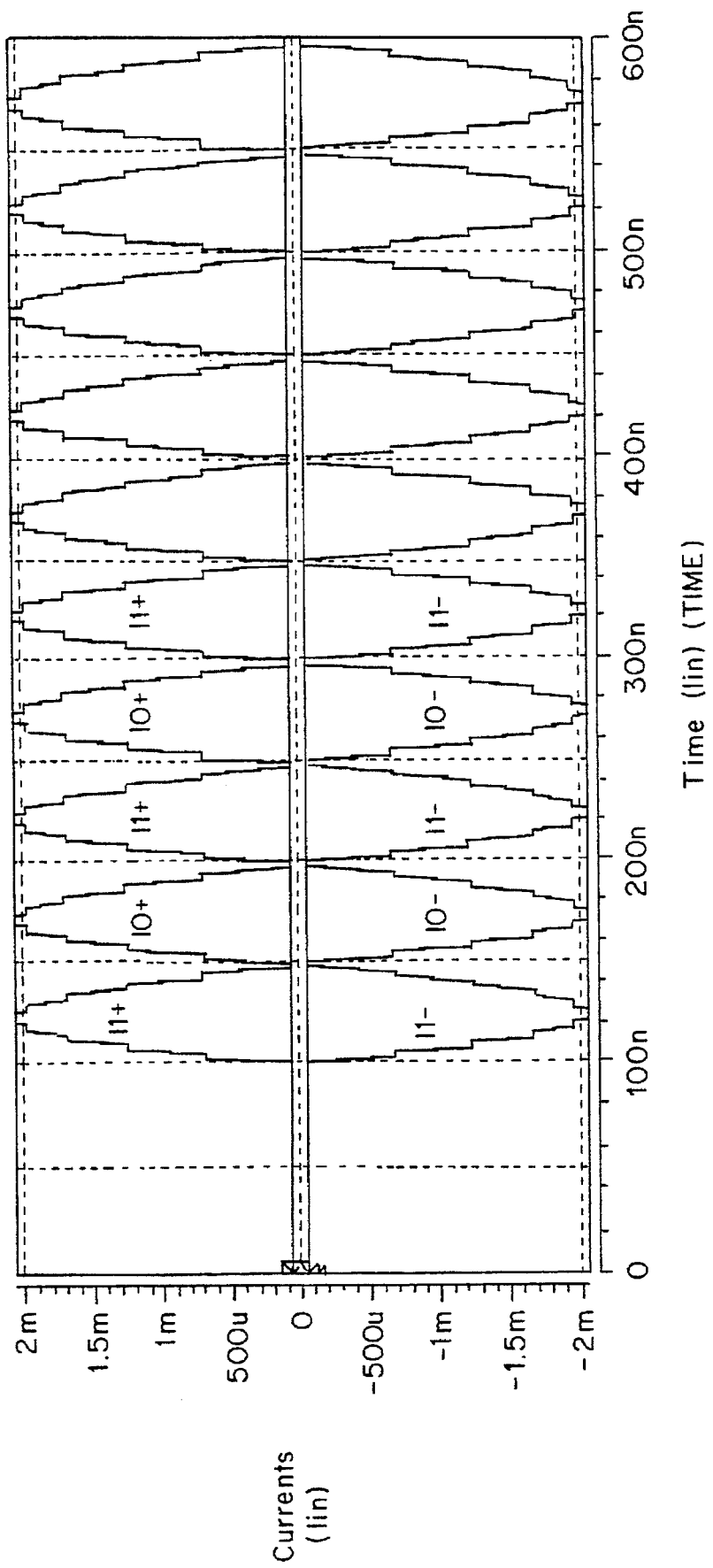
FIGS. 6A and 6B are a signal diagram of the output signals of the amplifier illustrated in FIGS. 4 and 5 in response to the input signals.
Figure 6B:
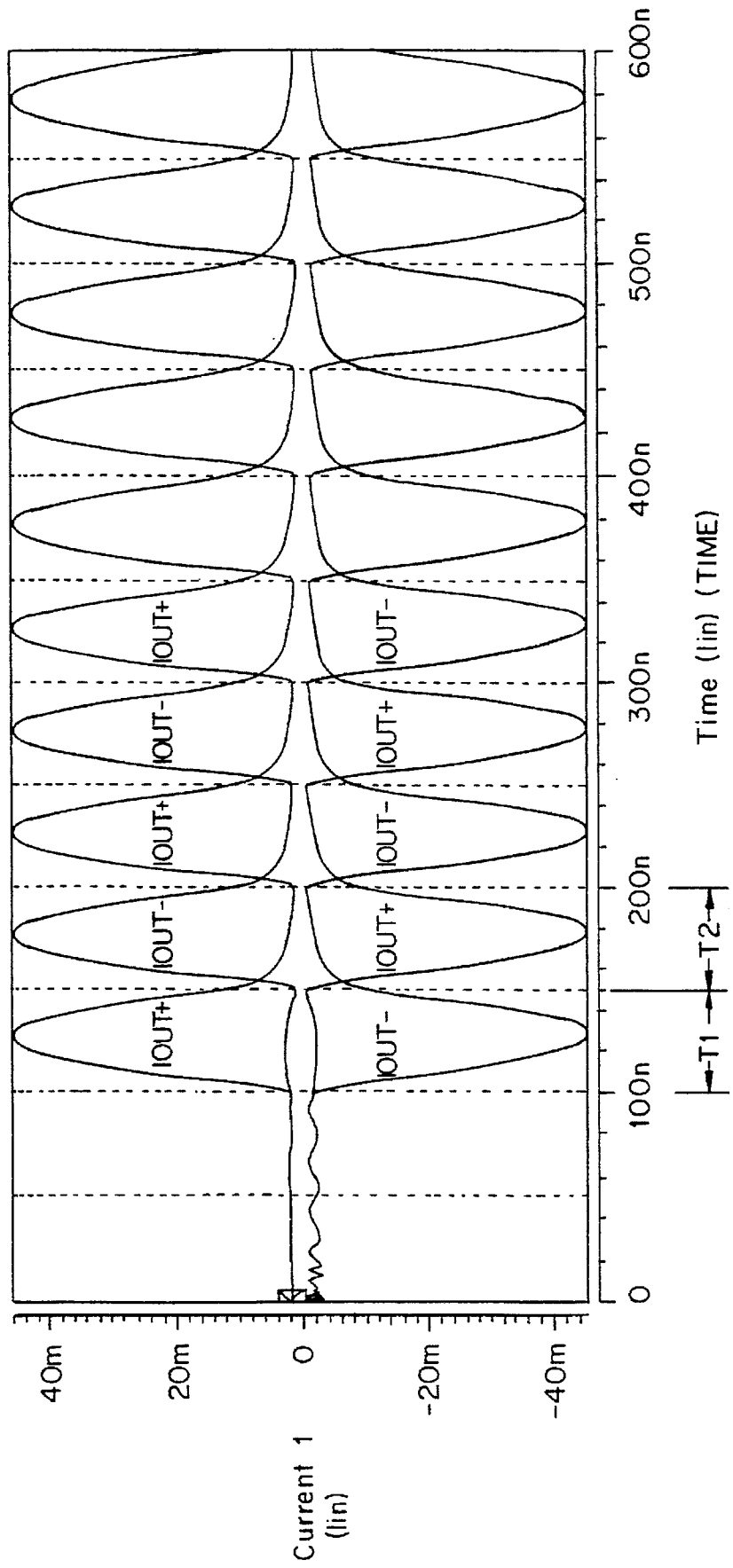
Figure 7A:
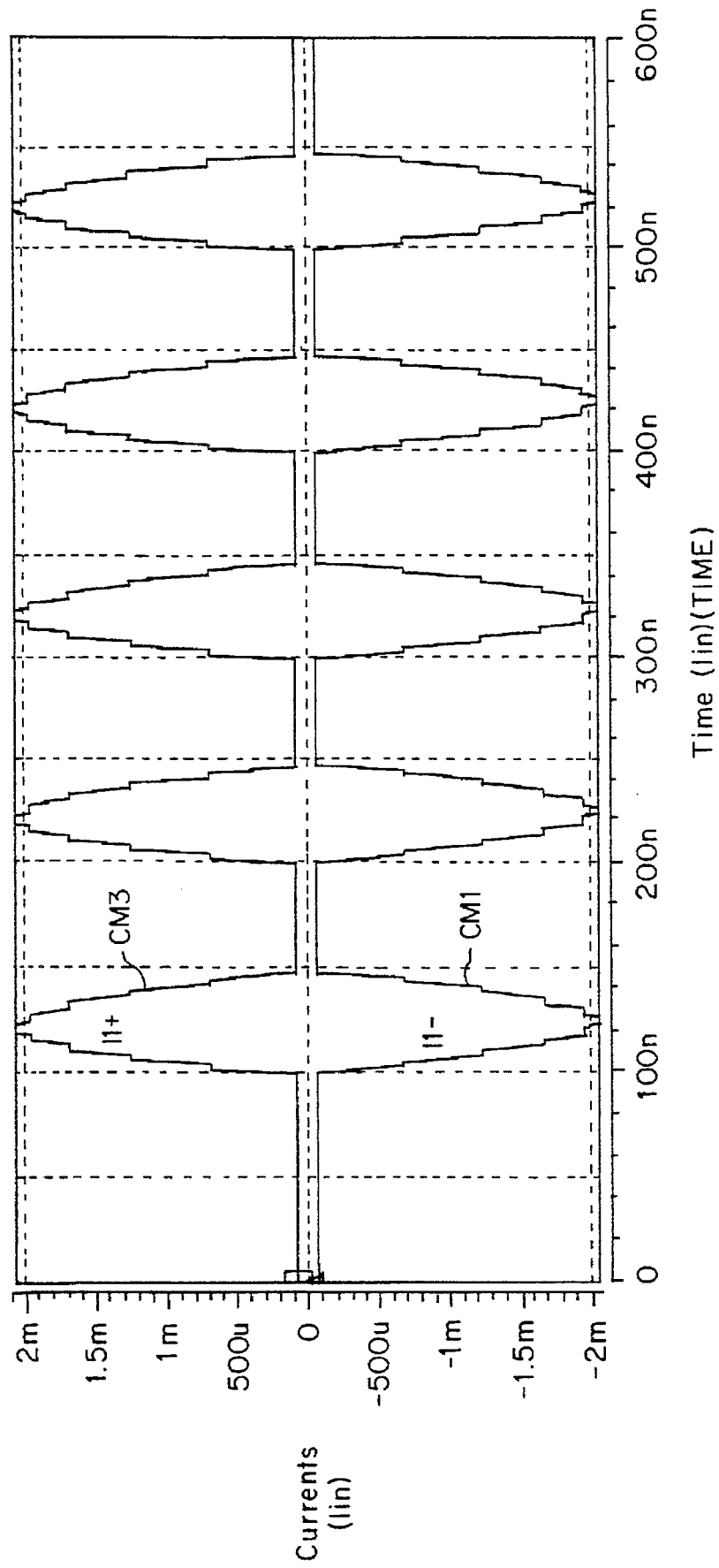
FIGS. 7B and 7B show the output response of the amplifier in accordance with the present invention as the input signals are applied to the input terminals I1+ and I1−.
Figure 7B:
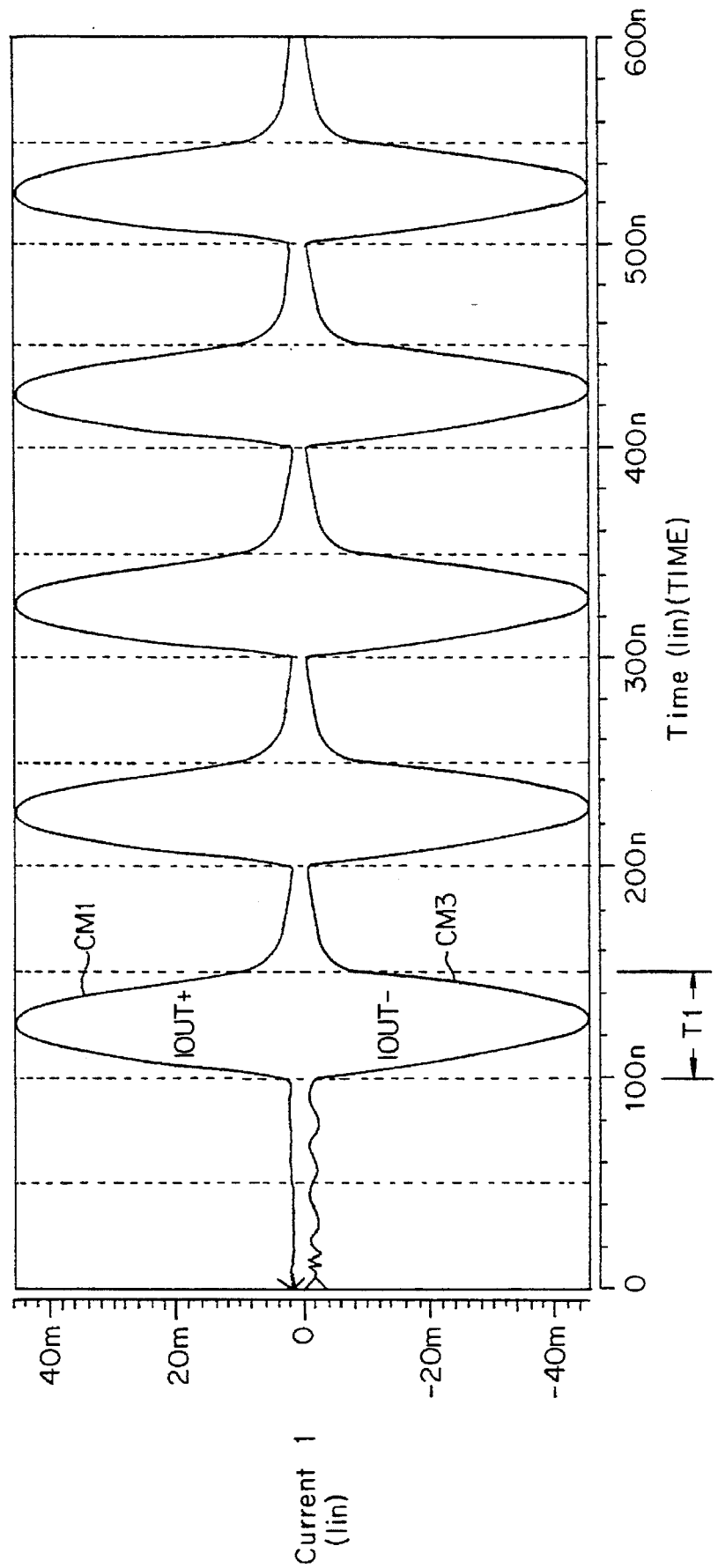
Figure 8A:
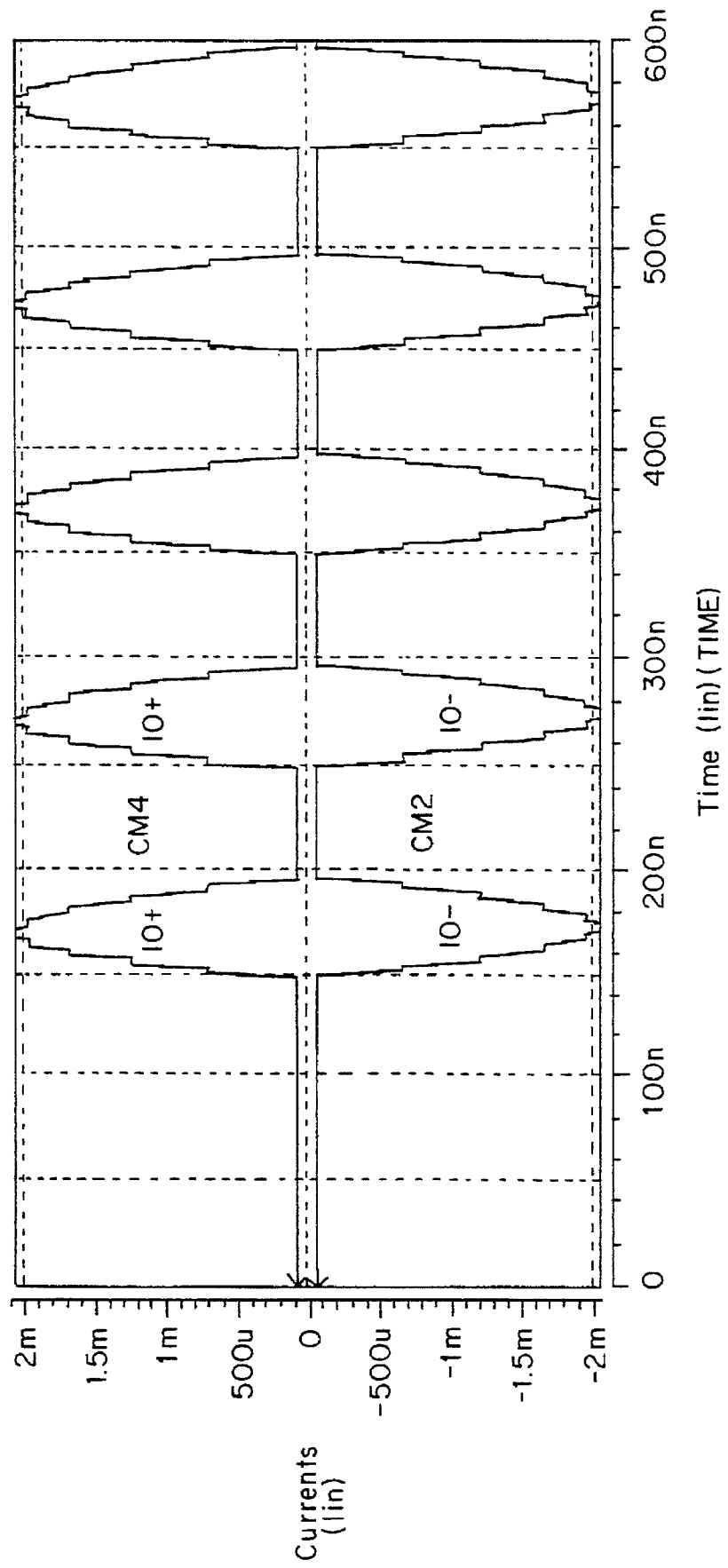
FIGS. 8A and 8B show the response of the amplifier in accordance with the present invention as the input signals are applied to the input terminals I0+ and I0−.
Figure 8B:
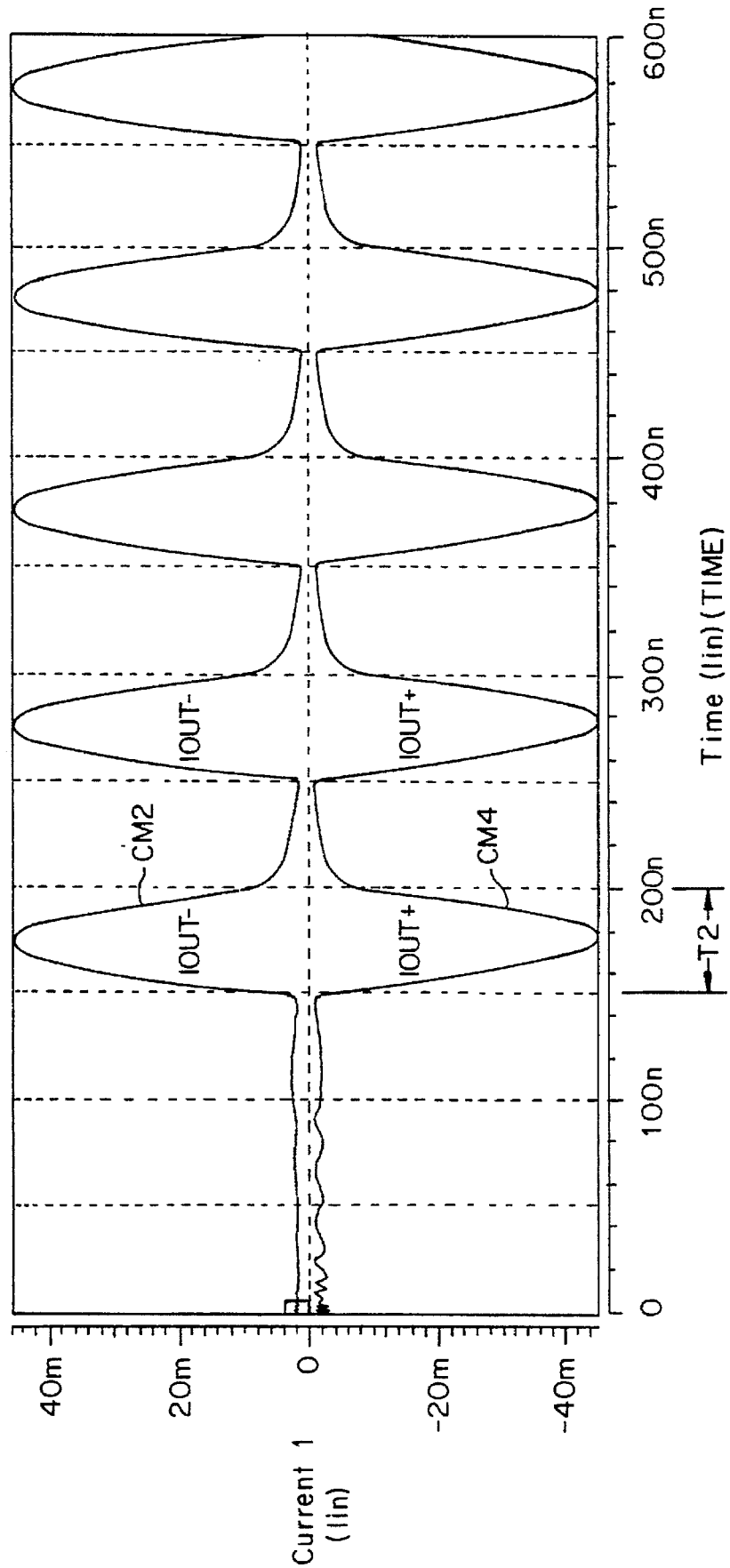

FIGS. 6A and 6B depict the output signals at the output terminals IOUT+ and IOUT− in response to the input signals of 10 MHz at the input terminals I0+, I0−, I1+ and I1−. FIGS. 7A, 7B, 8A and 8B show the response of the amplifier 120 as the input signals are applied to the input terminals I1+ and I1− and the input terminals I0+ and I0−, respectively.

During a time period T1, the transistors MI1− and MI1+ of the current mirror circuits CM1 and CM3 start to turn ON when the input signals at I1− and I1+, respectively, fall and rise. In response, the transistors MP1 and MN1 mirror the current at the transistors MI1− and MI1+. The transistor MP1 increases the output current at the output terminal IOUT+, and the transistor MN1 reduces the current level at the output terminal IOUT−. See FIGS. 7A and 7B.

When the input signals at the input terminals I0− and I0+ go low and high, respectively, during a time period T2, the transistors MI0− and MI0+ of the current mirror circuits CM2 and CM4 turn ON, and the current flows are mirrored at the transistors MP2 and MN2. As a result, the output current at the terminal IOUT− is raised by the transistor MP2 of the current mirror CM2 while the output current at the terminal IOUT− is reduced by the transistor MN2 of the current mirror circuit CM4. See FIGS. 6A and 6B.

A signal at the control terminal COM is used to enable or disable a first common mode feedback circuit F1 comprising a plurality of PMOS transistors MC0, MC2, MC4 and MC6, and a second common mode feedback circuit F2 comprising MC1, MC3, MC5 and MC7. The common mode feedback circuits F1 and F2 are connected to a node VREF to receive a common mode output voltage level between the B resistors R5 and R6. When the signal at the terminal COM is at a logic high, the transistors MC0 to MC7 are enabled since the transistors MC0 and MC1 function as resistive elements. When the signal at the terminal COM is at a logic low, the transistors MC0 to MC7 are inactive since the transistors MC0 and MC1 function as open circuits.

When the common mode feedback circuits F1 and F2 are enabled, a common mode output voltage level is taken from the node VREF, between the resistors R5 and R6. The nominal voltage at the node VREF is mostly controlled by the resistivity ratio between the resistors R5 and R6.

When the voltage at the node VREF changes from the nominal value, the current densities in transistors MC0, MC2, MC1 and MC3 also change from their nominal values. The change of a drain-source current $I_{ds}$ for the transistor MC2 mirrors to the transistors MC4 and MC6, and the change of a drain-source current $I_{ds}$ for the transistor MC3 mirrors to the transistors MC5 and MC7.

For example, when the output IOUT+ and IOUT− have a positive increment of the common mode voltage, there is a positive increment of the nominal voltage at the node VREF. The current $I_{ds}$ of the transistor MC2 decreases, and the current $I_{ds}$ of the transistor MC3 decreases. This leads to an increase in the current $I_{ds}$ of the transistors MC5 and MC7, and a decrease in the current $I_{ds}$ of the transistors MC4 and MC6, decreasing the common mode voltages at the output terminals IOUT+ and IOUT−.

As described above, the common mode feedback circuits F1 and F2 prevent development of the common mode output voltages, where both signals at the output terminals IOUT+ and IOUT− increase or decrease at the same time. The common mode output voltage is generally undesirable in the differential current amplifier 120 of FIGS. 4 and 5, where the signals at the output terminals IOUT− and IOUT+ increase and decreases, or vice versa, at the same time. Without the common mode feedback circuits F1 and F2, distortion of the signals at the output terminals IOUT+ and IOUT− likely will result.

FIG. 5 shows a pair of common mode feedback circuits F1 and F2, which are enabled simultaneously in the invention. As can be appreciated, NOT gate 122 can be eliminated to enable the circuits F1 and F2 alternately, if desired. Further, rather than using both circuits F1 and F2, one of them can be eliminated, which is sufficient to prevent the common mode output voltages at the terminals IOUT+ and IOUT−. Moreover, if the common mode output voltages are not important for a particular application, the differential amplifier 120 can be designed without the common mode feedback circuits F1 and F2.

The bridging configuration prevents production of quiescent currents, i.e., there are no output signals when no input signals are present at the input terminals I0+, I0−, I1+ and I1−. Further, only two current mirror circuits are ON at the same time. For example, if the signal at the terminal I1− falls and the signal at the terminal I1+ rises (FIG. 4), the current mirrors CM1 and CM3 turn ON. However, since the signals at the terminal I0− and I0+ are at high and low logic levels, respectively, the current mirror circuits CM2 and CM4 are turned OFF. Similarly, when the current mirrors CM2 and CM4 are turned ON in response to the input signals of low and high logic levels, respectively, the current mirrors CM1 and CM3 are turned OFF.

In other words, the current mirror circuits CM1 and CM3 are commonly controlled, and the current mirror circuits CM2 and CM4 are commonly controlled. The current mirror circuits are arranged as a bridge network with the current mirror circuits CM1 and CM3 in first and third legs of the bridge network, respectively, and the current mirror circuits CM2 and CM4 in second and fourth legs of the bridge network. Hence, the current mirror circuits CM1, CM3 and CM2 and CM4 are controlled complementary to each other, and the amplifier 120 is a class B amplifier with a low power consumption.

The resistors R1, R2, R3 and R4 are used to provide path mirroring the input currents from the input transistors MI0−, MI0+, MI1− and MI1+ to the output transistors MP2, MN2, MP1 and MN1, respectively. The input transistors MI0+ and MI1+ are sized to 1/M of the output transistors MN2 and MN1, while the input transistors MI0− and MI1− are sized to 1/N of MP2 and MP1, where the preselected constants M and N are mirroring ratios in the current mirror circuits CM1–CM4 to amplify the input current to a sufficient strength to drive an output load, such as a transmission line, connected to the terminals IOUT+ and IOUT−. Likewise, the PMOS transistor MC2 is sized to $1/K_1$ of the PMOS transistors MC4 and MC6, and the NMOS transistor MC3 is sized to $1/K_2$ of the NMOS transistors MC5 and MC7, where the preselected constants $K_1$ and $K_2$ are mirroring ratios to control the amount of the mirroring current. Further, the resistors R5 and R6 generally have substantially the same prescribed resistivity.

The resistivity values and the mirroring constants are dependent on the process to fabricate the amplifier. For example, the resistors R1–R4 and R5–R6 may be about 200 ohms and 2K ohms in value, respectively, and the constants M, N, K1 and K2 may be about 25, 25, 26 and 27, respectively, to generate the output signals in response to the input signals of 10 MHz, illustrated in FIGS. 6A, 6B, 7A, 7B, 8A and 8B. Such values can be adjusted to generate output signals of higher frequencies, such as N*10 (N is a constant), in response to the input signals by a simple design adjustment to the values. Hence, the resistive values and mirroring ratio can be chosen to meet the design requirements.

Further, the frequency response bandwidth can be easily controlled. The resistor network (R1 through R4 in FIG. 5) together with the transistor gate capacitance are used to control the RC time constant from the input to the output. The amplifier's nominal pole can be easily placed by specifying the resistor or MOS transistor size. A frequency compensation circuit, such as a separate RC component in the conventional op-amp design, is not needed since the MOS transistor characteristic is fully utilized.

Figure 1:
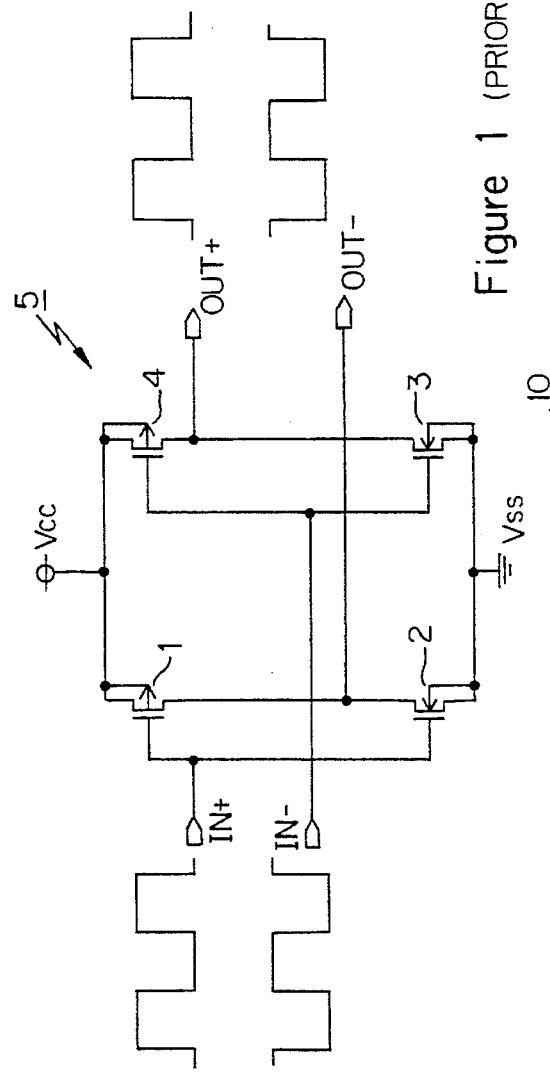
FIG. 1 is a schematic diagram of a conventional digital line driver.
Figure 2:
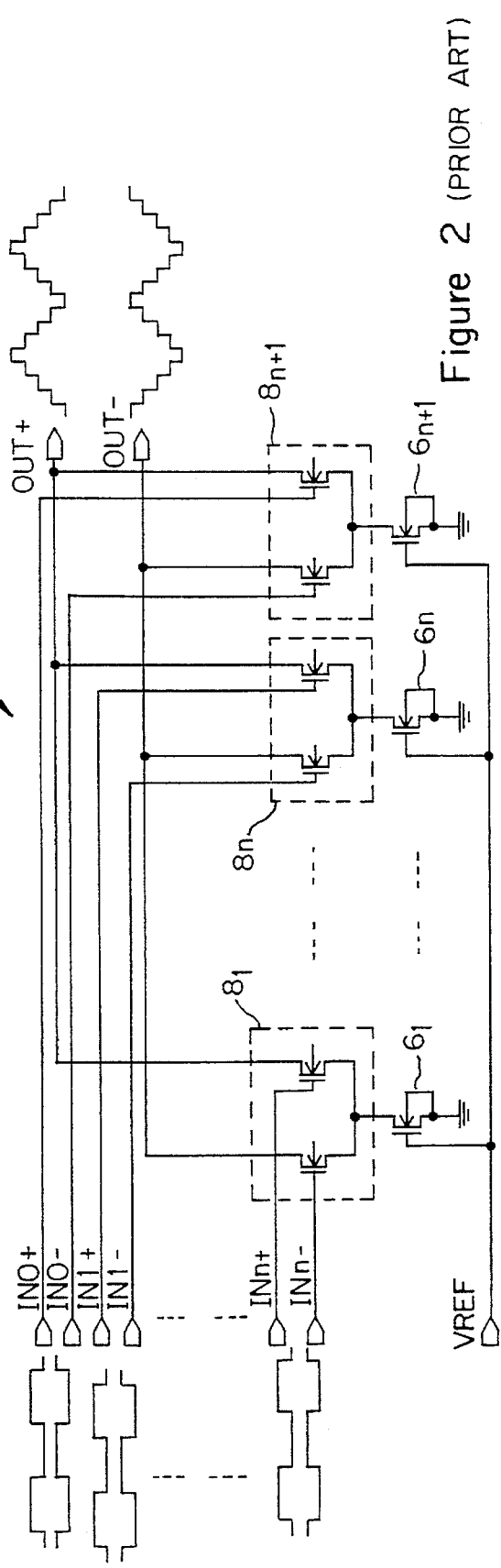
FIG. 2 is an illustration of a conventional digital-to-analog converter (DAC)

Unlike the op-amp design of FIG. 3, which is closed loop, the present invention does not have a feedback path which could result in an unstable operation. Further, the present invention occupies a small area on the silicon. Without the common mode feedback circuits F1 and F2, which occupy only a small portion of the silicon area, the differential amplifier design is as simple as the digital line driver of FIG. 1. The present invention has small transistor count, and silicon usage is as efficient as the driver of FIG. 1, without the disadvantages.

The present invention also allows high speed operation for the CMOS transistors. Since all the transistors operate in a current mode, the operating characteristics of MOS transistors are best utilized. The gain bandwidth of the amplifier can be achieved by far less relevance on transistor frequency characteristics $f_T$, compared to the voltage mode operation of the op-amp 14 in FIG. 3.

The differential current amplifier 120 of the present invention has lower power consumption. Because of the effective common mode feedback circuit, almost no quiescent current is required in the output transistors. The current amplifier 120 works close to a class B mode amplifier with a high power efficiency. Further, the common mode output voltage is controllable. The common mode feedback circuits F1 and F2 allow the common mode output voltage to be minimized. Since the common mode feedback is based on a direct current feedback, the circuits F1 and F2 have a fast response, and the common mode output voltage is instantly adjusted.

Compared to the conventional op-amp, the amplifier 120 of the present invention is small, stable and capable of high speed operation with low power consumption. The amplifier 120 is fully compatible with transistors made from the CMOS technology. The bandwidth and the common mode distortion are effectively controlled by a simple RC delay and current mode feedback.

The foregoing embodiment is merely exemplary and not to be construed as limited to the line driver for data communication between digital devices. The present invention can be applied to many devices requiring a line driver. The present invention is applicable to unshielded or shielded and twisted or untwisted cable pair. Many alternatives, modifications and variations will be apparent to those skilled in the art.

What is claimed is:

1. A line driver comprising:
    a plurality of input terminals,
    first and second output terminals, and
    a plurality of current mirror circuits coupled to said plurality of input terminals, said plurality of current mirror circuits including a first pair of current mirror circuits connected to said first output terminal, and a second pair of current mirror circuits connected to said second output terminal, said first and second output terminals being connected with each other to arrange the current mirror circuits into a bridge configuration.

2. The line driver of claim 1, wherein each current mirror circuit comprises a first transistor coupled to a corresponding input terminal and a second transistor coupled to a corresponding output terminal, and said first and second transistors are coupled to each other.

3. The line driver of claim 2, wherein said first transistor includes first and second load electrodes and a control electrode, and second transistor includes first and second load electrodes and a control electrode, said first load electrode of said first transistor is coupled to the corresponding input terminal, said first load electrode of said second transistor is coupled to the corresponding output terminal, said second electrodes of said first and second transistors are coupled to a source of predetermined voltage, and said control electrodes of said first and second transistors are conductively coupled to each other.

4. The line driver of claim 3, wherein each current mirror circuit further comprises a resistor coupled to said control electrodes of said first and second transistors.

5. The line driver of claim 4, wherein said resistor has a predetermined value to control a frequency response bandwidth of the line driver.

6. The line driver of claim 3, wherein said first and second transistors are PMOS transistors, and said predetermined voltage is a source voltage.

7. The line driver of claim 3, wherein said first and second transistors are NMOS transistors, and said predetermined voltage is a reference voltage of at least one of ground and 0 V.

8. The line driver of claim 4, wherein said first and second transistors operate in a current mode.

9. The line driver of claim 3, wherein the sizes of said first transistor and second transistor satisfy a prescribed ratio.

10. The line driver of claim 1 further comprising a first common mode circuit to prevent a common mode output voltage from being produced at each output terminal.

11. The line driver of claim 10, wherein said first common mode circuit is connected between a pair of resistors coupling said plurality of output terminals to each other.

12. The line driver of claim 11, wherein said first common mode circuit comprises a switching means responsive to a control signal for turning ON or OFF said first common mode circuit, and a pair of current mirrors coupled to said switching means.

13. The line driver of claim 12, including a first transistor shared by said pair of current mirrors, and coupled to said switching element and a source of predetermined voltage, and each of said pair of current mirrors includes a second transistor coupled to said switching element, said source of predetermined voltage, and the corresponding output terminal.

14. The line driver of claim 13, wherein said switching element and said first and second transistors comprise PMOS transistors, said predetermined voltage is a source voltage, and the sizes of said first and second transistors satisfy a prescribed ratio.

15. The line driver of claim 13, wherein said switching element and said first and second transistors comprise NMOS transistors, and the sizes of said first and second transistors satisfy a prescribed ratio.

16. The line driver of claim 1 including a control circuitry for controlling said first pair of the current mirror circuits, and for controlling said second pair of the current mirror circuits, wherein said first and second pairs of the current mirror circuits are controlled complementary to each other.

17. A method of operating a line driver having a plurality of current mirror circuits coupled to a plurality of input terminals, said plurality of current mirror circuits including a first and a second pair of the current mirror circuits respectively coupled to first and second output terminals connected with each other to arrange the current mirror circuits in a bridge configuration, the method comprising the steps of:

inputting input signals to the input terminals;

simultaneously controlling the current mirror circuits in the first pair of the current mirror circuits;

simultaneously controlling the current mirror circuits in the second pair of the current mirror circuits, wherein said first and second pairs of the current mirror circuits are controlled complementary to each other; and supplying an amplified current via the first and second output terminals.

18. The method of claim 17 further comprising the step of preventing a common mode output voltage at each of the corresponding output terminal by increasing or decreasing a current level at a corresponding output terminal.

19. The method of claim 18 further comprising the step of controlling a frequency response bandwidth of the line driver by changing a resistive value of a resistor in a corresponding current mirror circuit.

20. The method of claim 18, wherein said step of preventing the common mode output voltage comprise the steps of:

sampling a voltage at the corresponding output terminal;

generating a current change in response to a change in the sampled voltage; and mirroring said current change to the corresponding output terminal.

21. An amplifier comprising:

a first pair of current mirror circuits being commonly controlled;

a second pair of current mirrors circuit being commonly controlled; and driver circuitry for controlling said first and second pairs of current mirror circuits in a complementary manner.

22. The amplifier of claim 21, wherein said current mirror circuits are arranged as a bridge network with said first pair of current mirror circuits respectively in first and third legs of the bridge network, and said second pair of current mirror circuits in second and fourth legs of the bridge network, respectively.

23. The amplifier of claim 22, wherein each of said first and second pair of current mirror circuits comprises:

a first transistor coupled to a corresponding input terminal;

a second transistor coupled to a corresponding leg of the bridge; and a resistor interconnecting said first and second transistors.

24. The amplifier of claim 23, further comprises a resistor interconnecting a pair of output terminals of each first and second pairs of current mirror circuits.

25. The amplifier of claim 21, further comprising means for preventing a common mode voltage from being produced at a pair of output terminals of said first and second pairs of said current mirror circuits.

26. The amplifier of claim 25, wherein common mode voltage preventing means comprises:

a pair of resistors connecting said pair of output terminals; and means for reducing or increasing a current level of each output terminal.

27. The amplifier of claim 26, wherein said means comprises:

a first switching element connected to said pair of resistors; and a third pair of mirrors connected to said switching element.

28. The amplifier of claim 27, wherein said third pair of current mirrors commonly share a transistor.

29. The amplifier of claim 27, wherein said means further comprises:

a second switching element connected to said pair of resistors; and a fourth pair of current mirrors connected to said second switching element.

30. The amplifier of claim 29, wherein said fourth pair of current mirrors commonly share a transistor.

* * * * *